Figure 1:
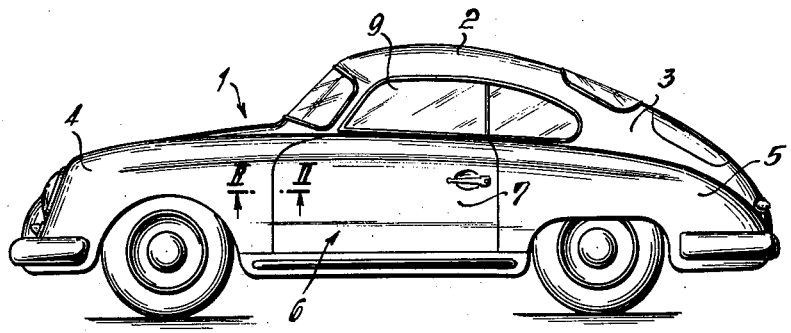

Jan. 22, 1963   E. KOMENDA   3,074,754
VEHICLE DOOR
Filed June 13, 1960   2 Sheets-Sheet 1

INVENTOR
ERWIN KOMENDA
ATTORNEYS

Jan. 22, 1963  E. KOMENDA  3,074,754
VEHICLE DOOR

Filed June 13, 1960  2 Sheets-Sheet 2

INVENTOR
ERWIN KOMENDA
BY Dicke, Craig & Freudenberg
ATTORNEYS

United States Patent Office 3,074,754
Patented Jan. 22, 1963

3,074,754
VEHICLE DOOR
Erwin Komenda, Stuttgart, Germany, assignor to Firma Dr. Ing. h. c. F. Porsche KG, Stuttgart-Zuffenhausen, Germany
Filed June 13, 1960, Ser. No. 35,809
Claims priority, application Germany July 9, 1959
3 Claims. (Cl. 296—44)

The present invention relates to a door for vehicles, especially for motor vehicles which consists of at least an outer and of an inner pressed or stamped part, preferably stamped sheet-metal panels whereby a seal may be arranged and held thereby within the area of the door rim.

Constructions are already known in the prior art in which the inner and outer stamped parts are provided with angularly bent rim flanges which are connected with each other by spot-welding. For purposes of securing the seal, this rim portion of the door is inwardly angularly bent and together with the door rim forms a channel in which the seal is arranged.

Constructions are also known in the prior art in which the rim portion of the door is located within the plane of the outer stamped part and the seal is retained at the door rim by means of bonding or cementing. However, in the latter type prior art constructions there exists the danger that the seal may become loose from the door rim as a result of climatic influences and, as a result thereof, an unobjectionable closing and sealing of the door gap can no longer be realized. A damage to the door seal may also occur in that case so that the seal has to be replaced necessarily. Furthermore, in case of poor abutment of the seal, water may also penetrate into the passenger space whereby the surrounding parts and especially the sheet-metal floor are exposed to an increased corrosion danger.

These disadvantages of the prior art constructions are avoided by the present invention by providing in the door rim a plurality of stamped-out portions arranged at a distance from one another which portions effectuate a shaped support for a correspondingly profile-shaped seal at the door rim. This type of fastening is not limited to a certain area but may be arranged at any desired distance from the outer stamped part. Moreover, such fastening is considerably more resistant against use and mechanical loads than, for example, fastening obtained by means of gluing, bonding or cementing.

The securing or fastening means in accordance with the present invention is additionally improved if the pressed-out portions in the door rim engage into correspondingly constructed recesses of the seal. The pressed-out portions of the door rim are thereby formed by portions which are composed of a flange portion disposed essentially perpendicular to the door rim and of an angularly bent portion adjoining the flange portion and extending essentially parallelly to the door rim. The recess in the seal is provided with a configuration matched in cross-section to that of the pressed-out portions and extends uninterruptedly over the entire length of the seal. As a result of such an arrangement at least the angularly bent portion, but preferably also the flange of the pressed-out portion is surrounded by the recess in the seal in the installed condition thereof. Additionally, there exists the possibility that the seal is provided with extensions which may be inserted through the apertures within the door rim resulting from the stamped-out portions therein.

Accordingly, it is an object of the present invention to provide a vehicle door construction, especially for motor vehicles which obviates the deficiencies and inadequacies of the prior art constructions.

Still another object of the present invention resides in the provision of a simple and reliable securing means for a seal to seal the door gap in vehicles which is simple and effective for the intended purposes.

Another object of the present invention is a vehicle door construction in which the seal may be readily secured without the danger of inadvertent loosening of the seal from the surrounding body parts.

A further object of the present invention resides in the support arrangement for a seal within the door gap of a vehicle which is essentially uninfluenced by external climatic conditions to which the vehicle may be exposed.

A further object of the present invention is the provision of a door seal for sealing the door gap of a vehicle in an unobjectionable, completely adequate manner which does not involve costly manufacturing or assembly operations.

A still further object of the present invention resides in the provision of a door seal which is not limited to any particular area within the door fold and which may be so arranged and located as to protect effectively the surrounding parts of the body against corrosion.

Figure 6:
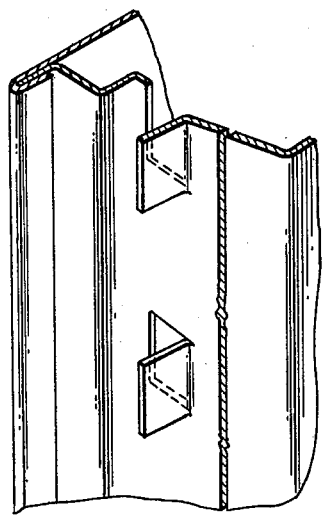
Figure 2:
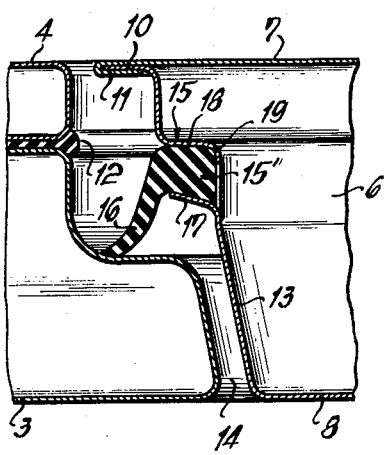

These and other objects, features and advantages of the present invention will become more obvious from the following description, when taken in connection with the accompanying drawing which shows, for purposes of illustration only, several embodiments in accordance with the present invention and wherein FIGURE 1 is a side elevational view of a passenger motor vehicle, FIGURE 2 is a cross-sectional view, on an enlarged scale, taken along line II—II of FIGURE 1, FIGURES 3, 4 and 5 are cross-sectional views, similar to FIGURE 2 of three further embodiments of door seal arrangements in accordance with the present invention, and FIGURE 6 is a side view of the embodiment of FIGURE 2, illustrating the arrangement of a plurality of flange portions.

Referring now to the drawing wherein like reference numerals are used throughout the various views to designate like parts, and more particularly to FIGURE 1, reference numeral 1 generally designates therein a passenger motor vehicle which is composed essentially of a stamped roof part or panel as well as of one lateral wall part or panel 3 each, preferably of detachable wheel covers 4 and 5 and of a door 6 for each vehicle side. The door 6 itself consists of an outer stamped panel part 7, of an inner stamped panel part 8 (FIGURE 2) and of a window 9 which is preferably adapted to be lowered into the door 6.

The connection between the outer and inner stamped panel parts 7 and 8 of the door 6 takes place by means of door fold portions. For that purpose, the inner stamped panel part 8 is provided with a rim portion 10 extending essentially parallelly to the vehicle outer body wall 7 whereby the outer stamped panel part 7 is folded or bent back upon itself around the rim portion 10 by means of the flange 11 thereof.

The wheel cover 4 is detachably secured at the lateral wall panel 3 by the interposition of an elastic insert 12 (FIGURE 2) and forms, together with the lateral wall panel 3 as well as with the door rim 13 of the inner stamped panel part 8 of the door, a door gap 14. For purposes of sealing the door gap 14, a seal 15 made of any suitable material and including a seal body 15' which is secured to the door folding 13. The seal 15 also includes a sealing lip or tongue 16 which abuts against the plate connected to the wall panel 3, for example, and arranged in face-to-face relationship with the door rim 13. Both the door rim and the plate are stepped in shape and the seal body 15' has a profile shape similar to the basic configuration of the stepped shape.

For purposes of securing or retaining the seal 15 at the door rim 13, the latter is provided with a plurality of flange portions 17, see FIGURE 6, which are obtained by local pressed-out or stamped-out portions of the door rim 13. As illustrated in FIGURE 2, the flange portions 17 form together with the angularly bent portion 18 of the door rim 13 a channel 19 for accommodating therein the seal 15. During assembly, the seal 15 is inserted into the channel 19 and is retained therein by a springy abutment thereagainst of the flange portions 17.

Figure 3:
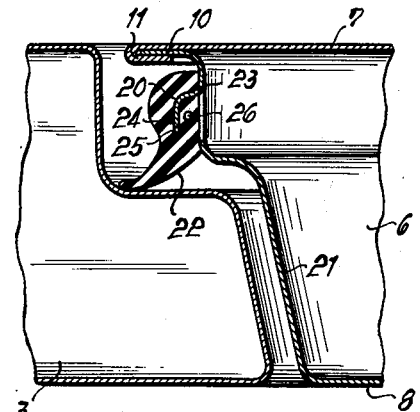

According to the modified embodiment in accordance with the present invention, illustrated in FIGURE 3, the flange portion 20 of the door rim 21, for purposes of effectively securing or retaining the door seal 22, is composed of a portion 23 disposed essentially perpendicularly to the door rim 21 as well as of an angularly bent portion 24 adjoining the portion 23 and extending essentially parallel to the door rim 21. The portion 23 and the angularly bent portion 24 of the web portion 20 engage in a correspondingly constructed recess or groove 25 of the seal 22 and are completely surrounded thereby. A cord 26, cable, or the like, is also embedded within the seal 22 in order to attain form rigidity of the seal 22, especially in order to prevent any change in the length thereof.

Figure 4:
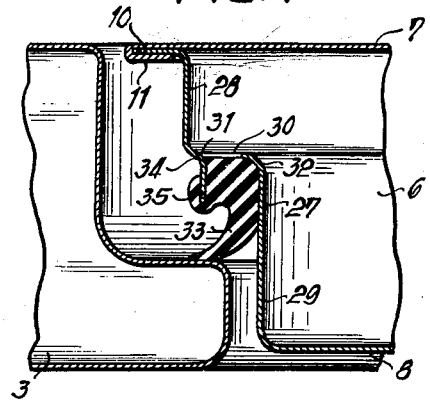

The door according to FIGURE 4 is provided with a step-shaped door rim 27 including portions 28 and 29 extending essentially perpendicularly to the outer stamped panel wall 7. The portions 28 and 29 are interconnected with each other by means of a portion 30 extending essentially parallelly to the outer panel wall 7. Apertures 31 are provided within the area of the portion 30 the plane of which extends essentially parallelly to the portions 28 and 29. The door seal 33 is accommodated within the channel 32 formed by the pressed-out portion 31 and the portions 30 and 29. The pressed-out portion 31 is surrounded on the side 34 thereof opposite the channel by means of a sealing lip 35 constituted by a portion of the seal 33 whereby an additional support of the seal 33 is realized.

Figure 5:
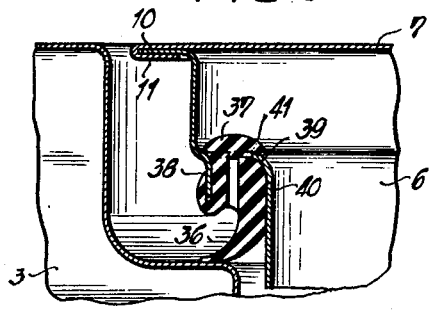

The mode of fastening or securing the door seal 36, illustrated in FIGURE 5, corresponds in its basic construction to that of FIGURE 4. However, different from the construction of FIGURE 4 is the fact that the seal 36 is provided with local projections 37 which are extended through the apertures 41 resulting from stamping-out or pressing-out the flange portions 38 out of the portion 39 of the door fold 40. The projection 37 is of larger dimension compared to the normal width thereof so that after being extended through the aperture 41, it abuts against a part 39 and thereby additionally retains the seal 36 in its assembled position.

While we have shown and described several embodiments in accordance with the present invention, it is understood that the same is not limited thereto but is susceptible of many changes and modifications within the spirit and scope of the present invention and we, therefore, do not wish to be limited to the details shown and described herein, but intend to cover all such changes and modifications as are encompassed by the scope of the appended claims.

I claim:

1. In a vehicle, a wall provided with an opening and comprising an inner and outer panel means and plate means at said opening connecting said inner and outer panel means to form a wall means partially defining said opening, a door member adapted to fit into said opening comprising inner and outer panel means and a step-shaped door rim means connecting said inner and outer panels, said plate means and said step-shaped door rim means being arranged in face-to-face relationship when said door is in its closed position, said door rim means having an angularly bent portion forming the step thereof intermediate said panel means and a plurality of spaced stamped-out resilient flange portions, seal means interposed between said wall and said door member for sealing said opening including a seal body and a sealing lip extending outwardly therefrom, and means for securing said seal body at said door rim means consisting of said flange portions which together with said angularly bent portion form the walls and bottom of a channel for accommodating therein said seal body, said seal body being retained in said channel by a springy abutment thereagainst of said flange portions which form one wall of said channel, said sealing lip extending outwardly from said seal body to sealingly engage said plate means when said door is in its closed position.

2. A construction according to claim 1, wherein said flange portions are formed adjacent said angularly bent portion and extend approximately at right angles to said door rim means.

3. A construction according to claim 1, wherein said flange portions are formed adjacent said angularly bent portion and extend approximately parallel to said door rim means.

References Cited in the file of this patent

UNITED STATES PATENTS

| 1,991,517 | Perry | Feb. 19, 1935 |
| 2,211,257 | Deisley | Aug. 3, 1940 |
| 2,219,382 | Conlon | Oct. 29, 1940 |

FOREIGN PATENTS

| 960,230 | Germany | Mar. 21, 1957 |